(No Model.) 2 Sheets—Sheet 1.

C. W. BUMPASS & W. M. McCANDLISH.
POULTRY COOP.

No. 592,194. Patented Oct. 19, 1897.

WITNESSES:
M. A. Blondel
P. B. Turpin

INVENTORS.
C. W. Bumpass
W. M. McCandlish
BY Munn & Co.
ATTORNEYS.

THE NORRIS PETERS CO., PHOTO-LITHO., WASHINGTON, D. C.

(No Model.) 2 Sheets—Sheet 2.
C. W. BUMPASS & W. M. McCANDLISH.
POULTRY COOP.
No. 592,194. Patented Oct. 19, 1897.
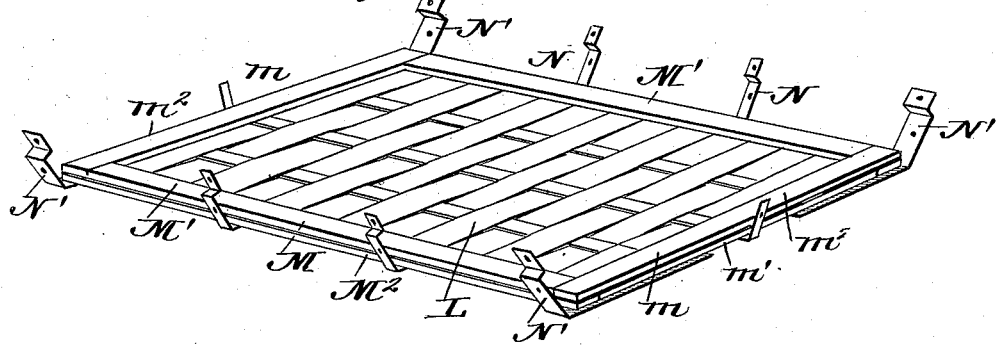
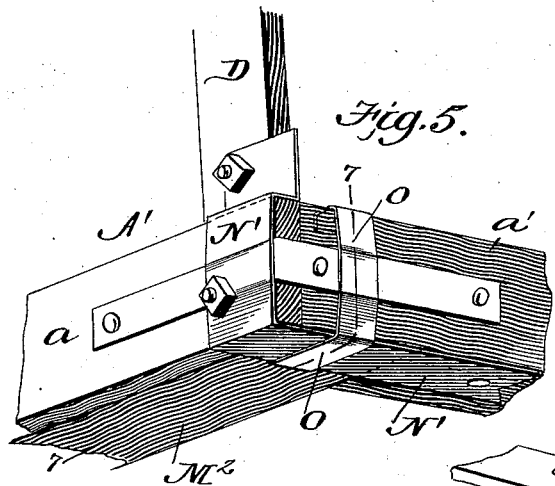
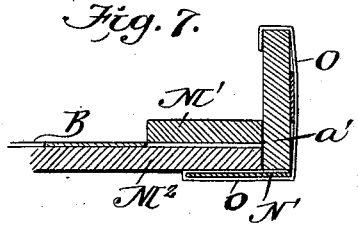
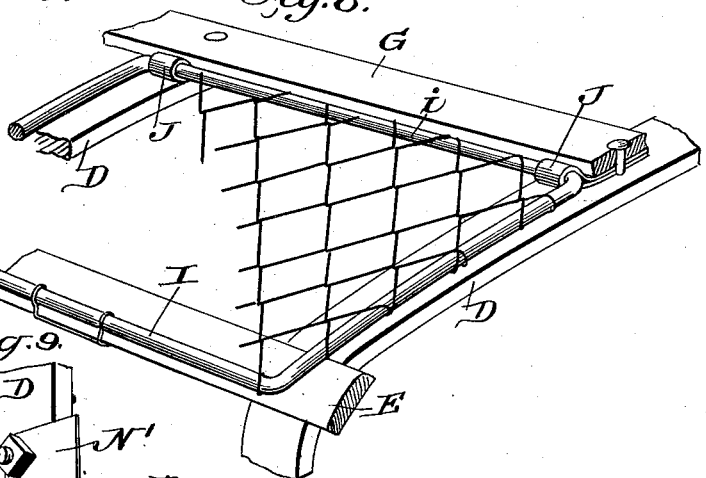
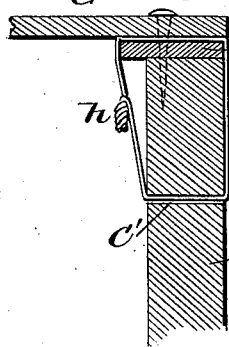
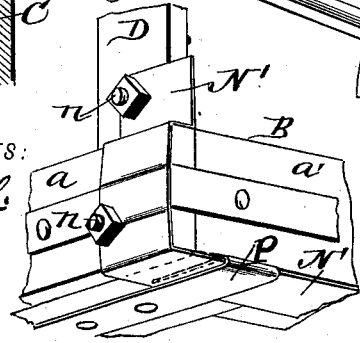
WITNESSES:
M. S. Blondel
P. B. Turpin
INVENTORS
C. W. Bumpass.
W. M. McCandlish.
BY Munn & Co.
ATTORNEYS.

UNITED STATES PATENT OFFICE.

CHARLES W. BUMPASS AND WILLIAM M. McCANDLISH, OF BUMPASS, VIRGINIA; SAID McCANDLISH ASSIGNOR TO SAID BUMPASS.

POULTRY-COOP.

SPECIFICATION forming part of Letters Patent No. 592,194, dated October 19, 1897.

Application filed February 18, 1897. Serial No. 623,946. (No model.)

*To all whom it may concern:*

Be it known that we, CHARLES W. BUMPASS and WILLIAM M. McCANDLISH, of Bumpass, in the county of Louisa and State of Virginia, have invented a new and useful Improvement in Poultry-Coops, of which the following is a specification.

Our invention is an improvement in poultry-coops such as are usually employed in shipping chickens, turkeys, ducks, and the like and the invention consists in certain novel constructions, combinations, and arrangements of parts, as will be hereinafter described, and pointed out in the claims.

Figure 1:
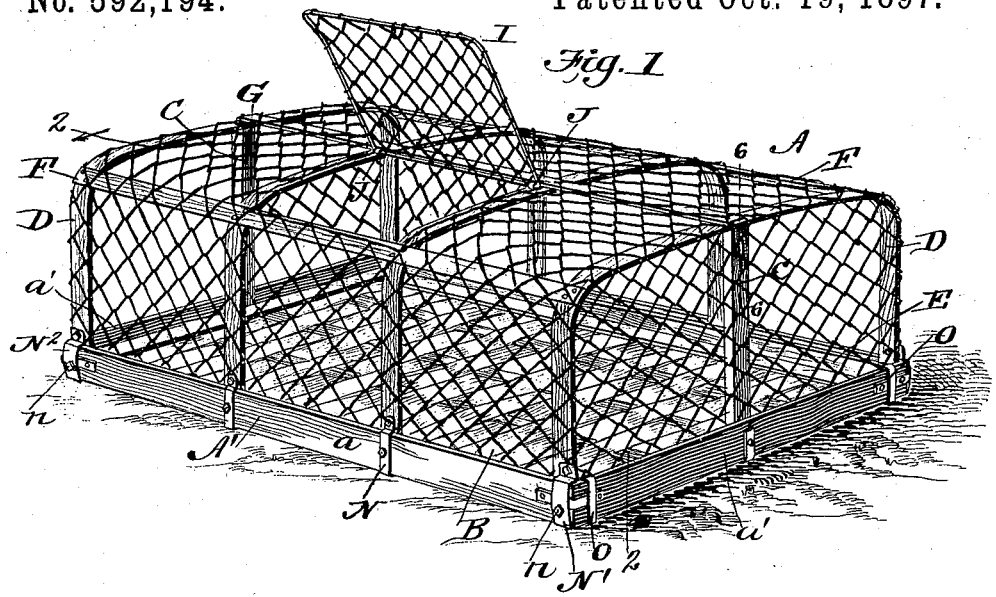
Figure 2:
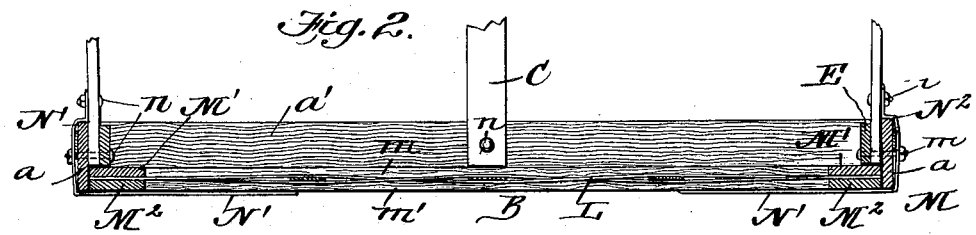
Figure 4:
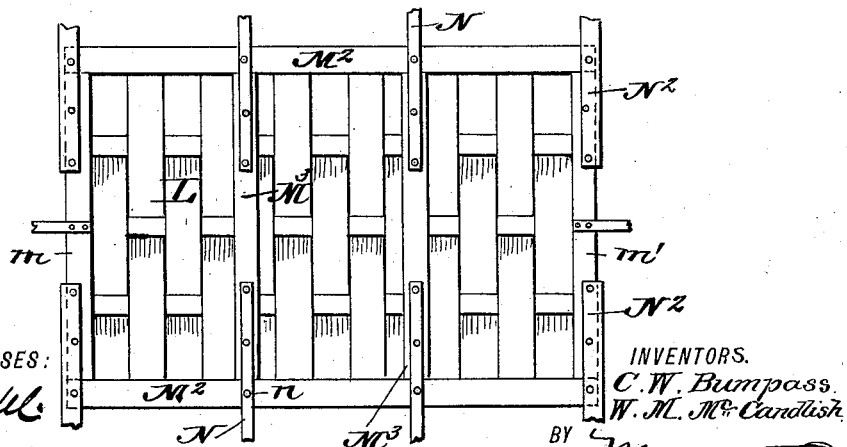

In the drawings, Figure 1 is a perspective view of the coop. Fig. 2 is a cross-section on about line 2 2, Fig. 1, of the lower portion of the coop. Fig. 3 is a detail perspective view of the bottom removed. Fig. 4 is a bottom plan view of the coop. Fig. 5 is a detail perspective view of one of the lower corners of the coop. Fig. 6 is a detail section on about line 6 6, Fig. 1. Fig. 7 is a detail section on about line 7 7, Fig. 5. Fig. 8 is a detail view illustrating the door-hinge, and Fig. 9 is a detail view illustrating a somewhat different arrangement of the slide-plate.

The coop is shown as formed in two parts, the main or upper part A and the bottom B. The upper part A is formed with the base-frame A', composed of side boards $a$ and end boards $a'$, united at their ends and forming a rectangular frame which braces and tends to hold the part A in shape at its lower end and forms a strong anchorage for the bows and posts of the coop. To this frame A' are secured the end posts C and the bows D, such parts C and D terminating at their lower ends at a point above the lower edge of the frame A' equal to the thickness of the bottom B, so such bottom when fitted in the frame A' will rest up against the ends of the post C and bows D and will lie at its under side in plane with the lower edge of the frame A'.

At their lower ends the bows D are protected by the battens E, secured over the inner sides of said bows at their lower ends, the battens and bows being securely fastened to the frame A'. Manifestly the purpose of setting the ends of the bows up from the lower edge of the frame A' is to form an abutment for the bottom, and the same result may be accomplished by offsetting the battens E, but we prefer to offset both the battens and bows, as shown. The side slats F and top slat G connect the bows and may be nailed or otherwise suitably secured thereto. The end bows are secured to the post C by means of wires H, passed through holes C' in the posts, thence over the end posts and twisted together at $h$, tying the end bows and posts C firmly together.

In hinging the door I we furnish the hinge-straps by bending a strip J of sheet metal between its ends around the door-wire $i$ and slipping the ends of the strip between the top slat and the middle bows and securing them by means of the nails which hold the said bows to the middle slats, as is best shown in Fig. 8 of the drawings.

The bottom B is preferably removable and is fitted and held within the base-frame A' of the coop. In connection with the removable bottom the base-frame A' forms an important feature, as it furnishes a comparatively rigid support for the body of the coop and facilitates the application and removal of the bottom B.

The bottom is composed of a basket-work floor L and the bottom frame composed of the sides M and the ends $m$. The sides and ends are composed of short sections M' and $m'$ and long sections $M^2$ $m^2$, the longer sections projecting at both ends beyond the ends of the short sections and the projecting ends of the long sections of the sides lapping under the projecting ends of the long sections of the ends, such construction greatly strengthening the bottom. The basket-work floor is clamped between the sections M' and $m'$ and the sections $M^2$ and $m^2$ and is reinforced by the bottom slats $M^3$, whose under sides are flush with the under side of the frame. This bottom is secured to the body by suitable devices, preferably such as shown, and consisting of the straps N, secured to the bottom, extended thence out under and up over the base-frame A' and bent in over the said frame A' and up alongside the upright portions of the bows. We secure the straps to the frames A' and to such upright portions of the bows, it may be by nails in cheap coops, or, if desired, bolts $n$ may be employed, such bolts serving to hold the bottom so it may be easily removed and replaced when desired to renew the bottom or for other desired purpose.

The straps N' at the ends of the bottom usually overlap the edges of the bottom frame so they will lie under and protect the ends of the frame A'.

To avoid wear on the bottom in dragging the coop, we provide what, for convenience, we term "slide-plates," which may be readily renewed when worn. In the construction shown in Fig. 5 these slide-plates are strips O of metal having one end slipped under the end straps N' from the side opposite the adjacent end of the bottom and bent thence below the said straps N' and carried up over the end bar of the frame A' and secured. This construction not only forms an efficient slide-plate, but also operates to brace the ends of the frame A' and prevent the same from splitting; but if desired the slide-plates may be provided as shown in Fig. 9, in which the strip P is inserted beneath the strap N' from the side thereof next the adjacent end of the bottom and then folded back and secured, as shown.

Manifestly these slide-plates may be quickly restored at a small expense.

The coop is covered with wire-netting, as shown, or other suitable material.

Having thus described our invention, what we claim as new, and desire to secure by Letters Patent, is—

1. A coop composed of the top having a base-frame and provided within said frame with downwardly-facing abutments for the bottom the bottom fitting in said frame up against said abutments, and the fastening-straps secured to the bottom and extending thence outward and upward alongside the base-frame and means securing said straps to top section of the coop all substantially as shown and described.

2. A coop consisting of the top portion having a base-frame, the end posts secured within and terminating above the lower edge of the base-frame, the bows and side battens secured within the base-frame and above the lower edge thereof, the bottom fitting in said base-frame below the said battens and end posts, and the straps secured to the bottom and extending thence up alongside the sides of the base-frame and secured substantially as shown and described.

3. In a coop substantially as described the combination of the top portion having a base-frame and provided within the same with downwardly-facing abutments, the bottom composed of the basket-work floor and the frame having sections fitting above and below the floor the straps secured to the floor and extended up alongside the base-frame, and the slides held at one end beneath the end straps and bent thence up over the end pieces of the base-frame and secured all substantially as and for the purposes set forth.

4. In a coop substantially as described the combination with the bottom of the straps secured thereto and the slide-plates fitted at one end under said straps and folded back below and across said straps and secured substantially as described.

CHARLES W. BUMPASS.
WILLIAM M. McCANDLISH.

Witnesses:
HILLERY McCANDLISH,
WALTER L. BUMPASS.